April 7, 1942.    C. W. TILTON    2,278,806
APPARATUS FOR WORKING SURFACES
Filed Aug. 2, 1940    3 Sheets-Sheet 2
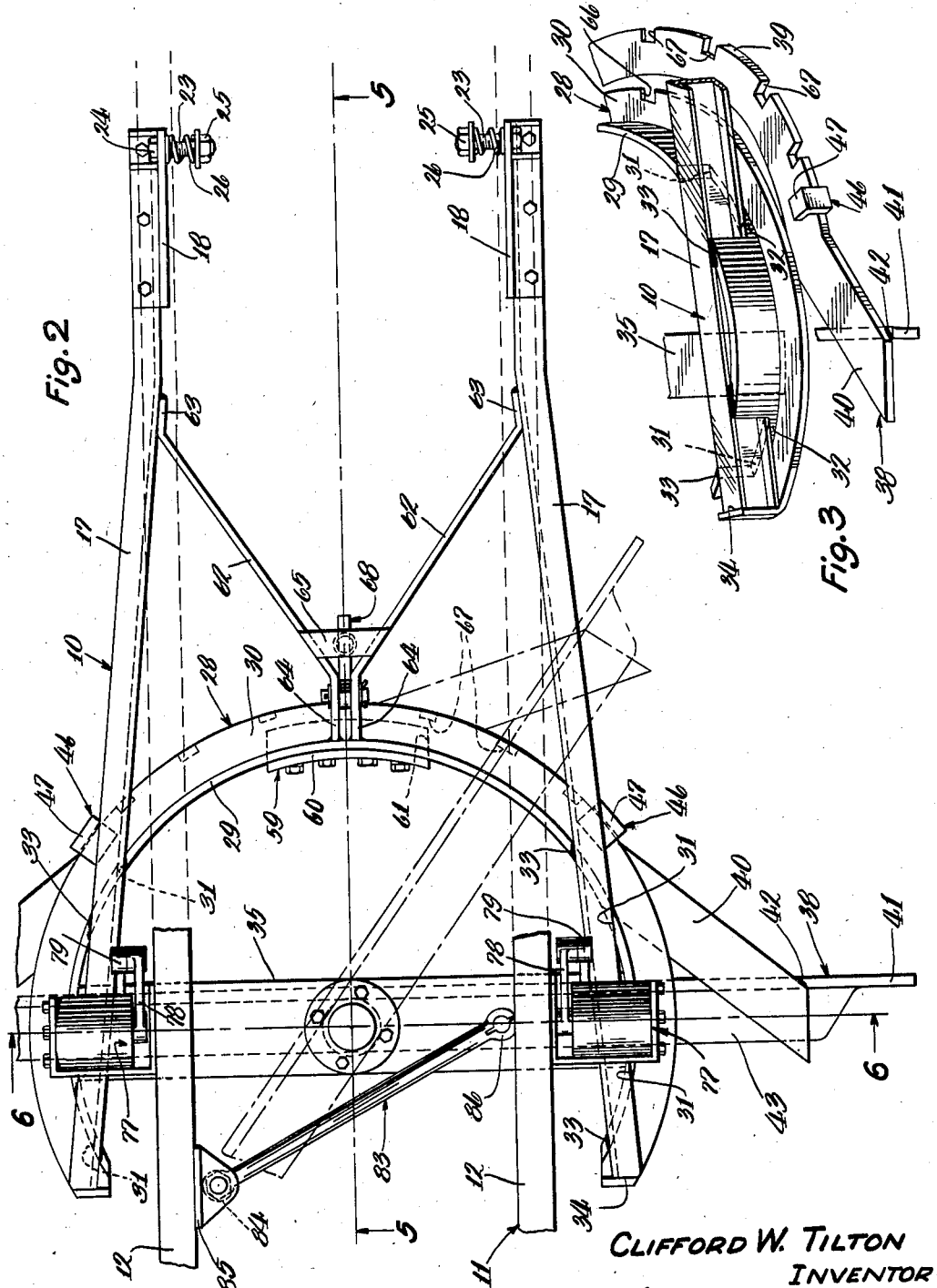
CLIFFORD W. TILTON
INVENTOR
BY Freeman, Scovil and Albrecht
ATTORNEYS

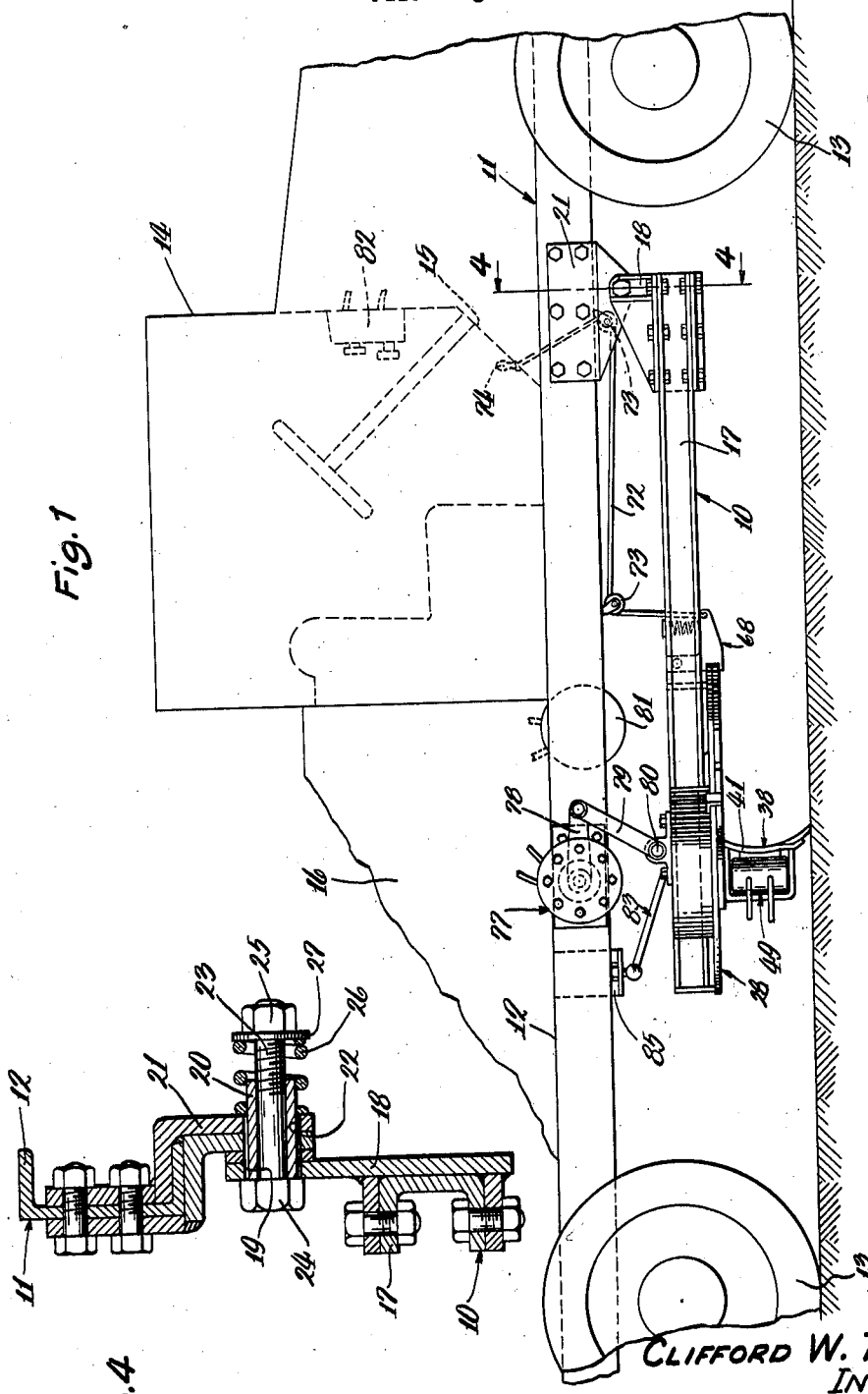

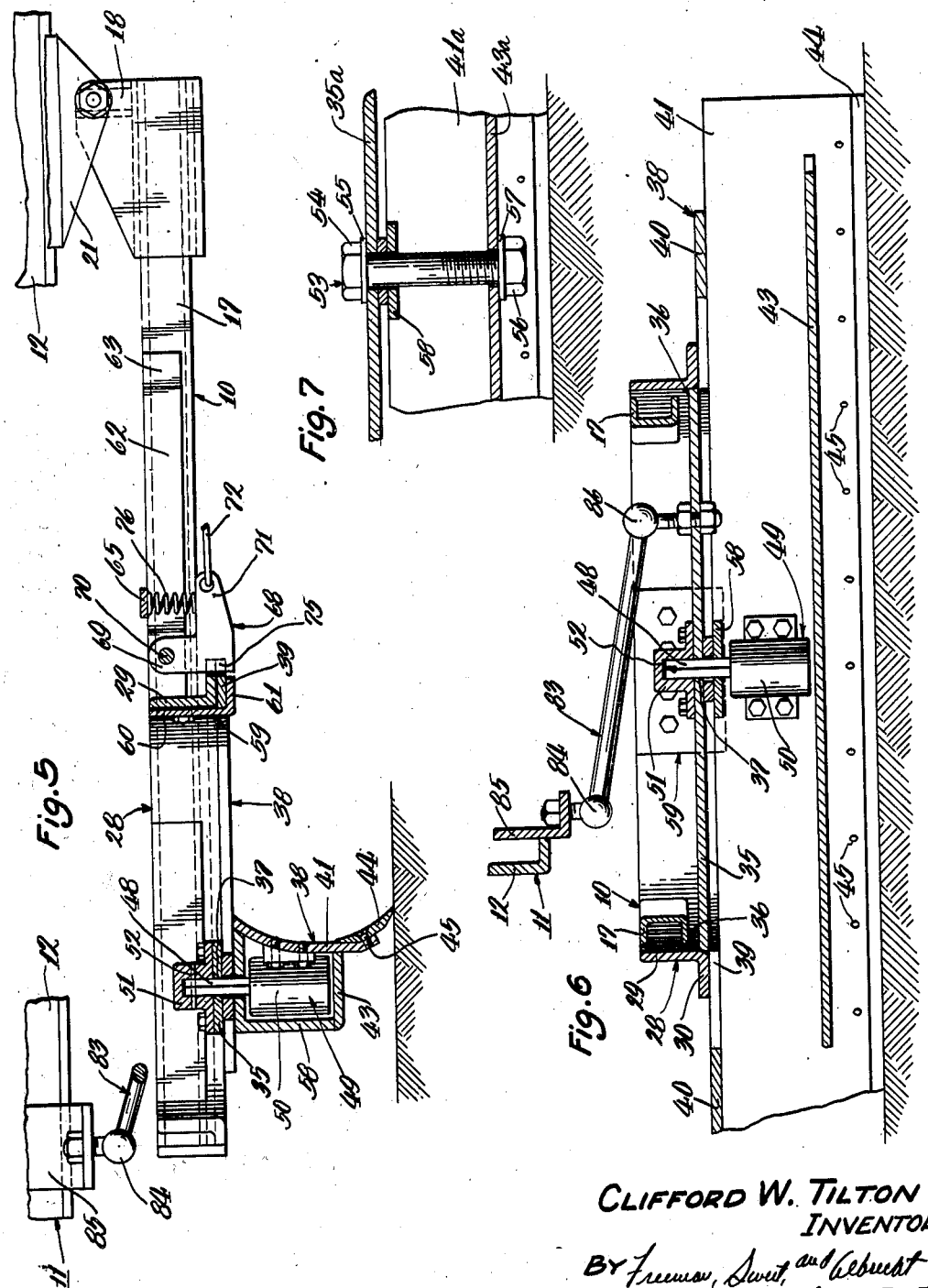

Patented Apr. 7, 1942

2,278,806

UNITED STATES PATENT OFFICE 2,278,806

APPARATUS FOR WORKING SURFACES

Clifford W. Tilton, Medina, Ohio

Application August 2, 1940, Serial No. 349,668

6 Claims. (Cl. 37—159)

This invention relates to apparatus for working surfaces, and particularly, such surfaces as roads and the like, and, more particularly, the invention relates to road maintaining apparatus. The principal object of this invention is to provide new and improved apparatus of this type.

In the drawings accompanying this specification, and forming a part of this application, there is shown, for purposes of illustration, embodiments which the invention may assume, and in the drawings:

Figure 1 is a side elevational view of an embodiment of the invention, showing this embodiment attached to an automotive vehicle, the latter being shown more or less diagrammatically and fragmentarily, Figure 2 is an enlarged plan view of the embodiment, certain parts being shown in a different position in dot-dash lines, Figure 3 is a fragmentary perspective view of a detail of the construction, Figure 4 is an enlarged vertical sectional view corresponding generally to the line 4—4 of Figure 1, Figure 5 is a longitudinal sectional view corresponding generally to the line 5—5 of Figure 2, Figure 6 is a transverse sectional view corresponding generally to the line 6—6 of Figure 2, and Figure 7 is a detail sectional view showing a slightly different form of a detail.

Referring particularly to Figures 1 through 6 of the drawings, the embodiment of the invention therein shown comprises a supporting means 10, adapted to be connected to a vehicle, which preferably comprises an automotive vehicle of the gasoline-motor truck type. Such type of vehicle usually is formed with a frame 11, having spaced-apart connected rails 12 of channel cross-section, the vehicle frame being supported from the road surface by the usual wheels 13, and having a cab 14 provided with a floor board 15, and a truck body 16.

The supporting means 10 is preferably in the form of a frame generally underlying the vehicle frame, and has spaced-apart rails 17, desirably of channel cross-section. As best seen in Figure 2, the front ends of the rails 17, referring to the ends of the rails directed toward the forward end of the truck, are preferably spaced apart a distance approximating the distance between the rails 12 of the truck frame 10, and rearwardly of such front ends, the rails 17 preferably diverge so that their rear ends are spaced-apart a greater distance than the spacing of the truck frame rails 12.

The front end of each of the rails 17 is connected to the frame 11 of the vehicle in such manner that the supporting means 10 is movable about axes transverse to each other. In the embodiment herein shown, a bracket 18 is securely fixed to each front end, preferably by bolting such bracket to its respective end as herein shown. Each bracket 18 preferably extends upwardly beyond its respective rail 17, and adjacent its upper end is formed with an aperture 19, the apertures 19 preferably being aligned along an axis extending transversely with respect to the frame 11 of the vehicle. Each aperture 19 loosely receives a sleeve 20. Extending downwardly from each of the rails 12 of the vehicle frame 11 is a bracket 21, which is suitably secured to its respective rail, as by means of the bolts herein shown. Each bracket 21 is formed with an aperture 22 loosely receiving a respective sleeve 20.

Extending through each of the sleeves 20 is the shank 23 of a bolt, the bolt having a head 24 and a threaded end receiving a nut 25, the nut 25 being so positioned that the bolt may move axially through the sleeve 20, and that the sleeve may move axially and tilt with respect to the apertures through which it passes. A coil spring 26 encircles the bolt and its sleeve, and is interposed between a washer 27 bearing against the nut 25, and the adjacent surface of the bracket 21, the spring 26 yieldably holding the bolt against movement.

From the description so far, it will be evident that the supporting means 10 may be swung about an axis formed by sleeves 20 and their respective bolts, so that the rear end of the supporting means, referring to the end directed toward the rear end of the automotive vehicle, may be swung toward and away from the road. Also, since the sleeves 20 fit loosely through the apertures in respective brackets 18 and 21, and because of the fact that the sleeves and bolts may move axially, the supporting means may be tilted, that is to say, one rail 17 of the supporting means 10 may be moved a greater or lesser distance from the road than the other rail.

Track means 28 is supported by the supporting means 10. In the particular embodiment shown, referring particularly to Figures 2 and 3, the supporting means 10 and track means 28 are constructed and connected so as to provide for economy in manufacture without sacrificing structural strength. As herein shown, the track means is of angle cross-section, and bent so as to form an arc of a circle, the center of the arc lying generally in a vertical plane passing through the longitudinal axis of the supporting means 10. The track means 28 has a generally vertical flange 29 and a generally horizontal flange 30, the vertical flange 29 being formed with pairs of spaced-apart recesses 31, the bottom of each recess 31 stopping short of the horizontal flange 30, as best seen at 32 in Figure 3. Each of the recesses 31 is of such shape as to closely receive a portion of the rails 17, and when the rails are in their respective recesses the top flange of each rail 17 is preferably flush with the upper margin of the vertical flange 29. The rails 17 and the track means 28 are fixedly connected together, preferably by welding along meeting surfaces at the recesses 31, as indicated at 33. If desired, the ends of the horizontal flange 30 may be bent upwardly, as shown at 34, so as to bear against and brace the ends of the rails 17. The rails 17 and the upwardly bent ends 34 may also be welded together, if desired.

Extending transversely with respect to the rear ends of the rails 17, and through the center of the arc of the track means 28, is a supporting strip 35, having its lower surface preferably disposed in a plane including the lower surface of the horizontal flange 30, as best seen in Figure 6. The supporting strip is fixedly secured to the track means 28, preferably by welding, as shown at 36. The supporting strip 35 is formed with an aperture 37 aligned with the center of the arc of the track means 28, and the aperture 37, in the construction shown in Figures 1 through 6, is non-circular in shape, and preferably square as shown in Figure 6.

Blade means 38 is provided for cooperation with the track means 28, and includes a bearing portion 39 preferably in the form of a plane surface having generally the same curvature and width as the horizontal flange 30, but in this instance of a lesser arcuate extent than the horizontal flange 30. The ends of the bearing portion 39 are bent outwardly to form wings 40. A mold board 41, preferably formed of suitable metallic material, is fixedly secured to the bearing portion 39, as by welding this mold board to the wings 40, as shown at 42, the wings 40 providing considerable surface contact for welding purposes. As shown, the mold board may be provided with a strengthening web 43 extending the length of the mold board. A blade 44, preferably formed of suitable metallic material, is removably secured to the mold board 41, in this instance being secured by a plurality of countersunk head screws 45.

The bearing portion 39 is formed with a plurality of hook flanges 46, here shown to be two in number, and each arranged so as to extend about the defining margin of the horizontal flange 30, and having a top part 47 overlying the upper surface of the horizontal flange 30, the hook flanges acting as guides and supports for movement of the blade means 38 along the track means 28. Since the recesses 31 stop short of the horizontal flange 30, clearance is provided for movement of the hook flanges past the point of connection of the rails 17 and the track means 28.

At the center of the arc of the track means 28 is a single holding means for holding the blade means 38 assembled with the track means 28. In the construction shown in Figures 1 through 6, the holding means comprises a shaft 48 connected to the mold board 41 and extending upwardly through the aperture in the supporting strip 35, and suitably detachably secured to the supporting strip 35. The construction shown in Figures 1 through 6 is designed to incorporate means for causing movement of blade means 38 along the track means 28, and such means preferably comprises a fluid motor 49, having its casing 50 fixedly secured, as by bolts, to the mold board 41, and its shaft 48 extending upwardly through the aperture in the supporting strip 35, the extending part of the shaft being square and closely fitting the defining surfaces of the aperture so as to hold the shaft against rotation. A cap 51, bolted to the supporting strip 35, is formed with a square recess for receiving the extremity of the shaft 48, and a pin 52, or other suitable removable connecting device, holds the shaft 48 in place in the cap 51. Thus it will be seen that when fluid under pressure is admitted to the fluid motor 49, the shaft 48 is held stationary and the casing 50 is caused to rotate, thus causing movement of the blade means 38.

To remove the entire blade means 38, which includes the blade 44, the mold board 41, and the bearing portion 39, it is merely necessary to disconnect the shaft 48 from the supporting strip 35. In the construction hereinbefore described, this is accomplished by removing the pin 52, and permitting the blade means to drop so that the shaft 48 is removed from the recess in the supporting strip 35. The blade means is then moved slightly toward the forward end of the vehicle to disengage the hook flanges 46 from the horizontal flange 30, which disengages the blade means and provides for its entire removal from the supporting means 10 and the vehicle. Thus the blade means 38 may be readily removed by disconnecting only a single connection, and the vehicle may then be used for purposes other than for maintaining roads and the like, without the added weight of the blade means, and with substantially the usual road clearances.

The construction shown in Figure 7 provides the quickly detachable features hereinbefore mentioned, but omits the fluid motor, since it has been found that the motor, although desirable, is not vitally necessary. Also, omitting the fluid motor reduces the cost of manufacture. In cases where the fluid motor is omitted, it has been found that the blade means 38 may be moved along the track by elevating the blade clear of the surface to be worked and manually moving the blade means, or, it has also been found possible to move the blade means by tilting the supporting means 10 so that one end only of the blade 44 is in engagement with the work surface, and moving the vehicle, causing the one end of the blade means in engagement with the surface to drag and cause turning of the blade means 38.

In the construction shown in Figure 7, a bolt 53 extends downwardly through an aperture in a supporting strip 35a, which is similar to the strip 35, and through an aperture in a web 43a formed on a mold board 41a, the web 43a and mold board 41a being respectively similar to the web 43 and mold board 41. The bolt 53 has a head 54 bearing against a washer 55, which in turn bears against the upper surface of the supporting strip 35a, and a nut 56 and washer 57 underlie the web 43a. To remove the blade means in the construction shown in Figure 7, it is merely necessary to unscrew the nut 56, and remove the bolt 53. It will be appreciated that in either construction, the holding means forms a pivot about which the blade means rotates. Also, in each construction, a bracket 58 is preferably secured to the web and the mold board for strengthening purposes.

A bearing bracket 59 is secured to the midpoint of the arcuate track, the bracket having a vertical leg 60 secured to the vertical flange 29, as by bolts as shown, and having a horizontal flange 61 underlying the bearing portion 39 of the blade means and additionally supporting the blade means. As best seen in Figure 2, the bracket 59 is curved to generally follow the curvature of the adjacent parts of the track means 28 and blade means 38, the bracket 59 forming a thrust surface engaging adjacent surfaces of the track means 28 and blade means 38, and substantially transmitting all forces between the track means and the blade means. In other words, a pulling force on the track means, as when the vehicle is moving forwardly, is transmitted to the blade means substantially entirely through the bracket 59. Conversely, a dragging force, set up when the blade means engages the work surface, is substantially entirely transmitted to the track means by the bracket 59. Thus, it will be seen that the holding means at the center of movement and the hook flanges 46 are relieved of considerable strain.

The supporting means 10 and the track means 28 are additionally braced by means of a pair of struts 62 fixedly secured to respective side rails 17, as at 63, and preferably by welding, the struts converging with respect to each other in a direction toward the track means 28, and terminating in a pair of spaced-apart ears 64 which are fixedly secured to the vertical flange 29 of the track means 28, also preferably by welding. A strip 65 straddles and is welded to converging portions of the struts 62.

As best seen in Figure 3, the horizontal flange 30 of the track means 28 is formed with a single marginal recess 66, preferably at the midpoint of its arcuate contour, while the bearing portion 39 of the blade means 38 is formed with a plurality of marginal recesses 67. A latch device 68, in the form of a lever having angularly disposed legs, is provided for holding the blade means against movement along the track means. One leg 69 of the latch device is pivoted about a pivot pin 70 extending between the spaced-apart ears 64, so that the device is swingably mounted. The other leg 71 of the latch device is attached to a cable 72 which runs over pulleys 73 and terminates in a pull handle 74 positioned within the cab 14 of the automotive vehicle, preferably near the floor board 15, as shown in Figure 1. The junction of the legs 69 and 71, of the latch device 68, provides a latch portion 75 adapted to fit within the recess 66 formed in the horizontal flange 30 of the track means 28, and within one of the recesses 67 formed in the bearing portion 39 of the blade means 38, thus holding the blade means in a selected adjusted position with respect to the track means. An upward pull on the handle 74 will cause pivotal movement of the latch device 68 in such manner that the latch portion 75 will be withdrawn from the recesses 66 and 67 so as to permit movement of the blade means 38 along the track means 28. A spring 76, interposed between the strip 65 and the leg 71 of the latch device 68, yieldably urges the latch portion 75 to locking position.

From the foregoing, it will be obvious that the blade 44 can be adjusted to a desired angle with respect to the line of travel, and can also be adjusted angularly in a plane transverse to the line of travel, and further the blade can be adjusted toward and away from the surface to be worked. To impart such movements, fluid motor means are provided, including the fluid motor 49 heretofore described. An additional pair of motor means 77, similar to the motor means 49, is provided, each one comprising a casing preferably secured to a respective one of the side rails 12 of the vehicle frame 11, and extending outwardly with respect to such side rail, as best seen in Figure 2. A shaft, connected to the rotor of its respective motor, carries a lever 78 which is pivotally connected to a lever 79, the lever 79 in turn being pivotally connected to a respective one of the side rails 17 of the supporting means 10, as shown at 80. The motor 49 and the motors 77 are connected, by means of conduits, to a pressure source, such as a main pressure generator 81, which may be carried by the automotive vehicle frame, and may be operated in any suitable manner, as for instance by the motor driving the vehicle. A suitable control means 82 preferably located in the cab 14, is suitably connected to the pressure source 81 and to the motors 49 and 77, and is so constructed and arranged that any one or all of the motors may be operated. Thus, with a proper setting of the control means 82, only the motor 49 may be operated to cause rotation of the blade means 38. Also, with a different setting, only the motors 77 may be operated, and these motors may be operated in unison to cause raising or lowering of the blade means, or one or the other of the motors 77 may be operated or the motors may be operated out of unison, so as to cause tilting of the blade means with respect to the work surface.

To relieve the connections of the motors 77 with the supporting frame 10, a bracing rod 83 is connected to the vehicle frame 11 and the supporting means 10, and is so constructed and arranged to permit the hereinbefore described movements, but to restrict all other movements. In the embodiment shown, the rod 83 has, at one end, a ball and socket connection 84 with a bracket 85 depending from a side rail 12 of the vehicle frame 11, and at its other end, has a ball and socket connection 86 with the supporting strip 35. Referring particularly to Figure 2, it will be noticed that the connection 86 is located approximately midway between the side rail 17 and the pivot connection of the track means 28 and blade means 38, while the connection 84 is offset and preferably positioned rearwardly and out of line with the connection 85.

The construction heretofore described, makes it possible to attach to a vehicle a sturdy, relatively low cost apparatus for working surfaces, such as roads and the like. The apparatus provides considerable road clearance, when it is out of engagement with the work surface, since the ends of the track means 28 and the adjacent ends of the rails are clear of engagement with the rails 12 of the vehicle frame 11. If desired, and with a proper positioning of the motors 77, these ends may be moved up to and beyond the lower surface of the rails 12. Because of the frame construction of the supporting means, and the particular construction of the track means, the transmission, drive shaft, differential, and other parts of the truck are readily cleared, thus permitting considerable movement of the apparatus with respect to the truck frame. The blade means 38, as before described, may be held in any adjusted position by the latch device 68, and is held from swinging clear of the track means 28, as for instance in case of failure of the latch device 68 by engagement of one or the other of the hook flanges 46 with a proper one of the upwardly bent ends 34 of the horizontal flange 30.

From the foregoing it will be apparent to those skilled in the art that I have accomplished at least the principal object of my invention, and it also will be apparent to those skilled in the art that the embodiments herein described may be variously changed and modified, without departing from the spirit of my invention, and that the invention is capable of uses and has advantages not herein specifically described; hence it will be appreciated that the herein disclosed embodiments are illustrative only, and that my invention is not limited thereto.

I claim:

1. Apparatus for working roads and the like, and for use with an automotive vehicle having a frame, comprising: a supporting frame, adapted to generally underlie the vehicle frame, and supporting road working means, said supporting frame including a pair of spaced-apart elongated rails extending generally in the same direction as the rails of the vehicle frame, each of the set of ends of said supporting frame directed toward the front of the automotive vehicle being apertured; a pair of bracket means, adapted to be rigidly secured to generally transversely aligned portions of the vehicle frame spaced from the front of the vehicle, each of said brackets being adapted to extend downwardly from the vehicle frame and each being apertured adjacent its lower end and this end being positioned adjacent the apertured part of respective supporting frame rails; connecting means, for connecting said supporting frame to said bracket means, comprising pivot means extending through aligned apertures in respective brackets and ends of said supporting frame, each of said pivot means being provided with abutments spaced apart a distance sufficient so that said pivot means can move axially in its apertures, and resilient means constructed and arranged to prevent free axial movement of said pivot means; the other ends of said supporting frame being swingable about the axis of said pivot means toward and away from the road; and each of said pivot means being of such cross-section that it may tilt in the apertures it fits through, so that said supporting frame may be tilted about an axis transverse to the axis about which it is swung.

2. Apparatus for use with an automotive vehicle, comprising: track means, having an angle cross-section, and bent to arcuate form, said track means being formed with two pairs of recesses; a supporting frame, adapted to be connected to the vehicle, including a pair of spaced-apart side rails, each side rail extending through one pair of recesses formed in said track means and being fixedly secured in position in said recesses, one flange of said track means providing a track; and blade means, for working roads and the like, constructed and arranged so that it moves along said track.

3. A frame structure, for use with apparatus of the character described, comprising: track means, having an angle cross-section, and bent to arcuate form, one flange of said track means being formed with two pairs of recesses; and spaced-apart rails, each rail extending through one pair of said recesses; the meeting surfaces of said rails and said one flange being structurally integrally united.

4. Apparatus for use with an automotive vehicle, comprising: a supporting frame, adapted to be connected to the vehicle; generally horizontally extending flange means carried by said frame, having an arcuate defining margin; blade means, for working roads or the like, having a surface bearing against the under surface of said flange means; a plurality of guide members extending from said blade means surface, against and around said defining margin, and overlying and bearing against the upper surface of said flange means; and bearing means, connected to said flange means, and bearing against the margin of said blade means surface opposite said defining surface, said guide members and said bearing means being so constructed and arranged to guide said blade means for free movement along said flange means and to receive from said blade means substantially all forces set up by movement of said blade means across a surface being worked.

5. Apparatus for use with an automotive vehicle, comprising: a supporting frame, adapted to be connected to the automotive vehicle, generally horizontally extending flange means, carried by said supporting frame, and having the form of an arc of a circle, said flange means having strip means formed with an aperture at the center of said circle; blade means, for working roads or the like, having a surface bearing against the under surface of said flange means, and having also a portion underlying said strip means and formed with an aperture at the center of said circle; power motivated means comprising relatively rotatable parts, one part being fixedly secured to said blade means and the other part having a shaft extending through the apertures in said strip means and said blade means portion, said shaft being connected to said strip means against relative rotation, so that relative rotation of said parts causes movement of said blade means along said flange means; single holding means, connected to said shaft and constructed and arranged to hold said shaft against axial movement through said apertures, thus holding said blade means assembled with said flange means; and combined bearing and guide means, constructed and arranged to guide said blade means surface for movement along said flange means, and to receive from said blade means substantially all forces set up by movement of said blade means across a surface being treated.

6. Apparatus for use with an automotive vehicle, comprising: arcuate track means, having an angle cross-section, and positioned so that its flanges are respectively disposed substantially horizontally and vertically, said vertical flange having two pairs of recesses, each extending from the defining margin of said vertical flange to a point spaced from the upper surface of said horizontal flange, and said horizontal flange providing an arcuate track; a supporting frame, adapted to be connected to the vehicle, including a pair of spaced-apart side rails, each extending through a pair of recesses and bearing on the lower defining margin of respective recesses thus forming a space between the lower portion of each side rail and the adjacent portions of the upper surface of said horizontal flange, and each of said side rails being fixedly secured in position in said recesses; blade means, for working roads or the like, having a surface bearing against the under surface of said flange means; a plurality of guide members extending from said blade means surface, around the defining margin of said horizontal flange, and bearing against the upper surface of said flange means, said guide means being constructed and arranged to guide said blade means for movement along said flange, and being of such size to pass through the space between the lower portion of each side rail and the adjacent portion of the upper surface of each side rail, thus providing for substantial movement of said blade means along said flange of said track means.

CLIFFORD W. TILTON.